Figure 1:
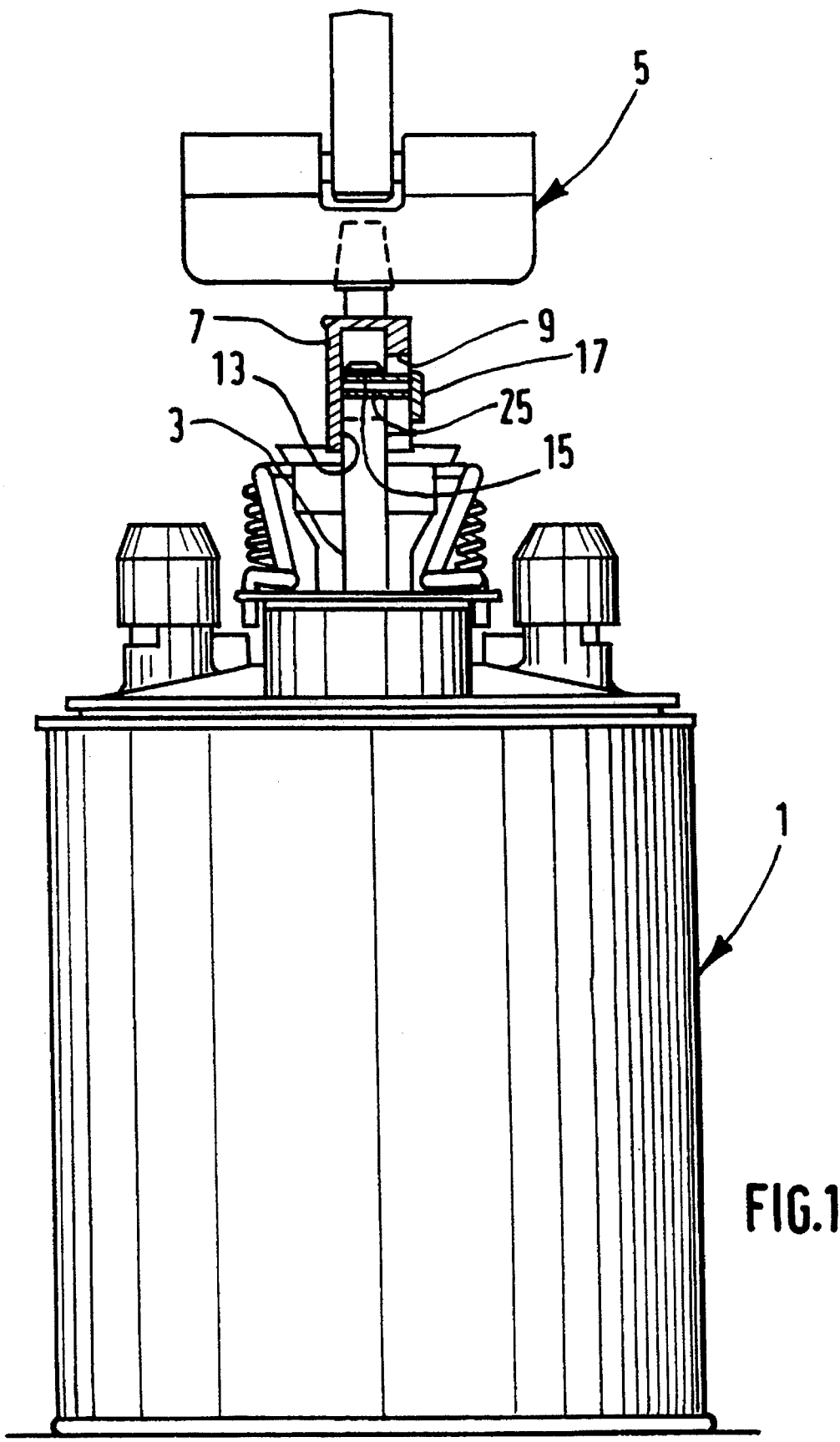

United States Patent [19]

Krzywdziak

[11] Patent Number: 5,456,534
[45] Date of Patent: Oct. 10, 1995

[54] ADJUSTABLE DEVICE FOR COUPLING THE DRIVER AND THE STIRRING ROD SHANK OF STIRRING DEVICES, ON PAINT STIRRING MACHINES

[75] Inventor: Alain Krzywdziak, Orleans, France

[73] Assignee: F.A.S., Saint-Jean-le Blanc, France

[21] Appl. No.: 223,772

[22] Filed: Apr. 6, 1994

[30] Foreign Application Priority Data

Apr. 7, 1993 [FR] France .................................. 93 04120

[51] Int. Cl.[6] ....................................................... B01F 7/20
[52] U.S. Cl. .......................... 366/249; 366/605; 464/77; 464/901
[58] Field of Search ................................. 366/244, 245, 366/249, 150, 251, 605, 279; 464/32, 77, 33, 901

[56] References Cited

U.S. PATENT DOCUMENTS 2,965,363  12/1960  Worden ................................. 366/605
3,010,616  11/1961  Johnson ................................ 366/605
3,118,653   1/1964  Dedoes ................................. 366/251
3,175,808   3/1965  Dedoes ................................. 366/605
5,160,198  11/1992  Fillon .................................... 366/249
5,169,232  12/1992  Fillon .................................... 366/249

Primary Examiner—Robert W. Jenkins
Attorney, Agent, or Firm—Scully, Scott, Murphy & Presser

[57] ABSTRACT

The invention relates to a coupling device on paint stirring machines.

This device calls upon a driver (5) in the form of a sleeve (7) receiving, in its bore, and with slight clearance, a stirring rod shank, the said sleeve being equipped with at least one longitudinal slot (9) and with external lateral notches, the stirrer shank (3) including at least one transverse drill hole (15), and a clip-shaped element (17) including two elastic tabs pointing toward one another in order elastically to surround the said sleeve of the driver, each of the said tabs further including an internal projection respectively complementing each of the said notches, the clip element (17) being provided with a pin element or rod (25) capable of engaging in the said drill hole of the stirring rod.

7 Claims, 2 Drawing Sheets

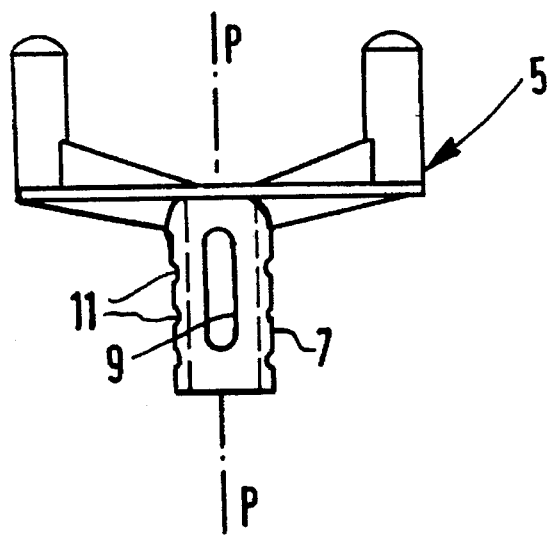
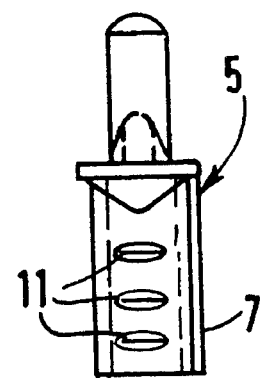
FIG. 2    FIG. 3
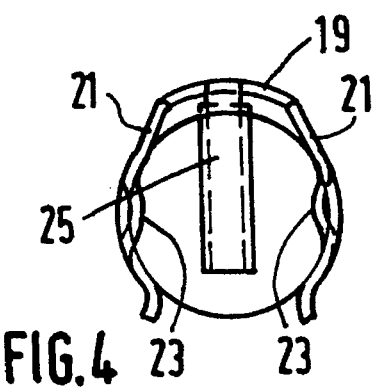
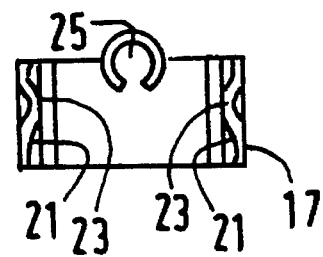
FIG. 4    FIG. 5
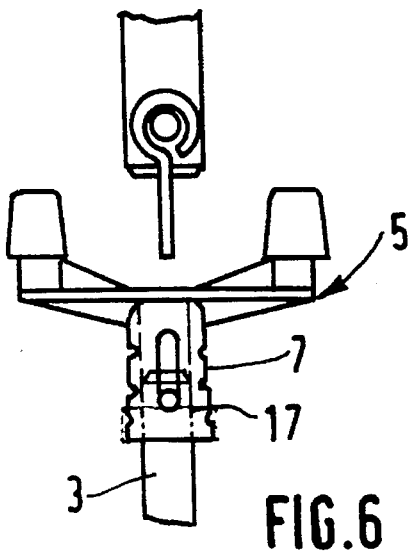
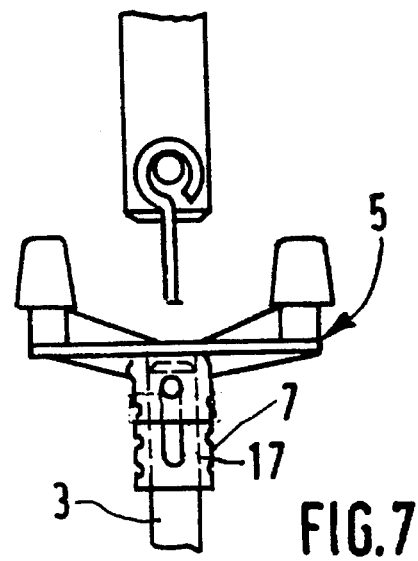
FIG. 6    FIG. 7

ADJUSTABLE DEVICE FOR COUPLING THE DRIVER AND THE STIRRING ROD SHANK OF STIRRING DEVICES, ON PAINT STIRRING MACHINES

The invention relates to the driving connection between the drive system and paint stirring devices on paint stirring machines. It relates particularly to an adjustable device for coupling the driver and the stirring rod shank on paint stirring machines.

It is known that the installation of various stirring lids on stirring machines with suspended pots requires the distance between the support shelf of the stirring lids and the upper drive plate of each of the drivers to be compensated for, which distance varies depending on the pots and the lids. It requires adjustment for fitting the coupling carried out by the user, and currently obtained simply using a pressure screw on the driver tightened to suit onto the shank of the stirring rod.

The invention allows such adjustment, but without tools. In effect, according to the invention, is proposed an adjustable device for coupling the driver and the stirring rod shank, intended for each of the stirring devices on paint stirring machines, characterized in that it calls upon a driver, of which the part for coupling to the stirrer rod shank is in the form of a sleeve receiving, in its bore, and with slight clearance, the said stirring rod shank, the said sleeve being equipped with at least one longitudinal slot formed on its wall, and with external lateral notches spaced apart longitudinally, the stirrer rod received in the sleeve including, at its upper end, at least one transverse drill hole, and a clip-shaped element including two elastic tabs joined to a base part and pointing toward one another in order elastically to surround the said sleeve of the driver, each of the said tabs further including an internal projection respectively complementing each of the said notches, the base part being provided with a pin element or rod extending toward the opening of the clip element and capable of engaging in the said drill hole of the stirring rod, the said clip element being capable of being engaged on the sleeve on the side of the slot by a simple manual push so as to lock the connection between the driver and the rod shank, the said pin element engaging in the slot and the hole in the stirrer shank, whereas simultaneously the tabs of the clip pinch the body of the sleeve at a suitable coupling height and their projections engage in the notches in the sleeve, and capable of being disengaged by pulling in the opposite direction in order to release the coupling connection.

Thus, by virtue of this arrangement, it is no longer necessary to use an intermediate tool with the risk that the tightening connection using a conventional screw might be effected poorly and consequently become defective over time. The coupling according to the invention is obtained by a manual action on the clip, pushing (to engage it) and pulling (to disengage it) at the desired height, corresponding to engagement of the tabs of the clip on the various notches which are spaced apart in terms of altitude on the sleeve so as to obtain, for each stirring device, an adequate joint of the coupling of the sleeve of the driver and of the stirring rod shank.

The invention is explained in more detail hereafter with the aid of an embodiment example and with reference to the appended figures in which:

FIG. 1 is a partial longitudinal sectional view of a device, according to the invention, for coupling between a driver of a paint stirring machine and the stirring rod of the pot of paint in question, FIG. 2 is an elevation view of the corresponding driver, FIG. 3 is a view of the driver according to FIG. 2 rotated through 90°, FIG. 4 is a plan view of the locking clip, FIG. 5 is a transverse sectional view of the clip, and FIGS. 6 and 7 show two, respectively high and low extreme positions of the coupling achieved.

FIG. 1 represents a pot of paint 1 mounted on a stirring machine (not represented). The paint contained in the pot is stirred by means of a conventional stirring rod 3 driven in terms of rotation. The stirring rod represented by its shank at the upper level is driven by means of a driver with a plate 5 coupled to the upper part of the stirrer shank 3. The driver (FIGS. 2 and 3) comprises a lower cylindrical body in the form of a sleeve 7 provided with a longitudinal slot 9 and with external lateral notches 11. These notches are spaced apart by an even amount over the length of the sleeve. They are six in number, formed parallel to the midplane P passing through the slot 9 in three series of two, diametrically opposite each other. The driver receives, in the bore 13 of the sleeve, the stirrer shank 3, which slides with slight clearance inside the sleeve. The shank includes a transverse drill hole 15 formed a slight distance from its upper end.

The stirrer shank is locked in position on the driver by means of a clip 17 engaged on the sleeve-like body of the driver.

The clip (FIGS. 4 and 5) includes a base part 19 to which are connected two curved elastic tabs 21 symmetric to one another with respect to the midplane of the base part. These tabs pointing toward one another form an opening at their front end, which is of slightly smaller size than the diameter of the sleeve. This opening allows the clip to be engaged on the sleeve of the driver, whereas it is pinched by the tabs. They are further equipped each with an internal projection or boss 23 complementing the notches 11. The base part 19 is provided with a cylindrical pin 25 extending toward the opening of the clip in its midplane and parallel to the tabs. This pin, complementing the drill hole 15 of the stirrer shank is received by the latter, when the clip is engaged on the sleeve of the driver.

The operation of the coupling device according to the invention is very simple..In effect, having located the driver at a suitable height for good driving connection of the upper plate of the driver relative to the stirrer shank, the clip is engaged on the sleeve on the slot side simply by pushing manually, so that the bosses of the tabs come over two opposite notches, closest to the desired height, the rod pin of the clip coming through the slot then into the transverse hole in the shank. When engagement is carried out, perfect locking of the coupling connection is obtained. The connection in terms of rotation is obtained by the rod pin of the clip bearing on the slot and the position in terms of altitude is obtained by the pinching engagement of the bosses of the tabs of the clip over the notches of the sleeve. The clip is held in position by the pinching effect of the tabs around the sleeve of the driver. It cannot escape and the connection remains perfectly ensured over time, in contrast to the conventional coupling of a clamping screw, which ends up losing its hold over time and loosening itself.

In order to release the connection and fit, for example, another pot, it is sufficient to pull the clip in the opposite direction from the aforementioned push. The sleeve can then be fitted at a different coupling height between the top (FIG. 6) and bottom (FIG. 7) limiting positions.

Naturally, embodiment variants may be added. The sleeve of the driver may exhibit other slots for passage of the rod pin for example ones offset angularly by 90° with systems of notches distributed in terms of height in order to multiply the possible altitude positions of the coupling. The systems of notches and projections locking the altitude of the coupling may be shaped in variable ways. Possibly, the stirrer shank may include several drill holes which are offset in terms of height so as to add further to the number of possibilities of coupling.

The foregoing clearly shows the advantages of the coupling device according to the invention as regards the ease of fitting the driving coupling for stirrers on paint stirring machines subject to permanent changes in the pots in question.

I claim:

1. Adjustable device for coupling a driver of a driving arrangement and a stirring rod shank of stirring devices on paint stirring machines, wherein said driver (5) which is coupled to the stirrer rod shank (3) comprises a sleeve (7) receiving in a bore at a clearance, said stirring rod shank, said sleeve having at least one longitudinal slot (9) formed in a wall thereof, and including external lateral notches (11) spaced apart longitudinally, the stirrer rod shank (3) within the sleeve (7) including at an upper end, at least one transverse hole (15), and a clip-shaped element (17) including two elastic tabs (21) joined to a base part (19) and extending towards one another to resiliently encompass said sleeve of the driver, each of said tabs including an internal projection (23) respectively complementing each of said notches (11), the base part (19) being provided with a pin element (25) extending towards the opening of the clip element and being engageable in said hole of the stirring rod, said clip element being engaged on the sleeve on the side of the slot (9) so as to effect a latching connection between the driver and the rod shank, said pin element (25) engaging in the slot and the hole in the stirrer shank, whereas the tabs of the clip concurrently engage the sleeve at a specified coupling height and the respective projections engage in the notches in the sleeve and disengageable therefrom by pulling in an opposite direction to release the coupling connection.

2. Coupling device according to claim 1, wherein the driver (5) includes a plurality of series of notches (11) located in pairs opposite each other on the sleeve.

3. Coupling device according to claim 1 or 2, wherein the clip element (17) is symmetrical with respect to a midplane of the base part (19).

4. Coupling device according to claim 2, wherein said opposite notches (11) are located parallel to a midplane of the driver, in a region in which the tabs of the clip engage the driver.

5. Coupling device according to claim 1, wherein the notches (11) have a variable configuration.

6. Coupling device according to claim 1, wherein a plurality of slots (9) are provided for insertion of the pin element (25), mated with systems of said notches (11) which are longitudinally offset.

7. Coupling device according to claim 1, wherein the stirrer shank (3) a plurality of said holes (15) which are offset along the length thereof.

* * * * *